United States Patent [19]

Pflaüm et al.

[11] Patent Number: 4,618,049

[45] Date of Patent: Oct. 21, 1986

[54] FRICTION PARTNERS FOR LUBRICATED FRICTION COUPLINGS

[75] Inventors: Hermann Pflaüm, Planegg; Herbert Vojacek, Munich, both of Fed. Rep. of Germany

[73] Assignee: Feldmühle Aktiengesellschaft, Dusseldorf, Fed. Rep. of Germany

[21] Appl. No.: 467,490

[22] PCT Filed: Jun. 4, 1982

[86] PCT No.: PCT/DE82/00120

§ 371 Date: Feb. 3, 1983

§ 102(e) Date: Feb. 3, 1983

[87] PCT Pub. No.: WO82/04295

PCT Pub. Date: Dec. 9, 1982

[30] Foreign Application Priority Data

Jun. 5, 1981 [DE] Fed. Rep. of Germany ....... 3122522

[51] Int. Cl.[4] .............................................. F16D 69/02
[52] U.S. Cl. .............................. 192/107 M; 192/53 F
[58] Field of Search ............. 192/107 M, 53 F, 113 B; 188/251 M, 251 A

[56] References Cited

U.S. PATENT DOCUMENTS

| | | | |
|---|---|---|---|
| 2,044,930 | 6/1936 | Zubaty | 192/53 A X |
| 2,256,320 | 9/1941 | Lapsley | 192/53 F |
| 2,410,511 | 11/1946 | Letsinger et al. | 192/53 F |
| 2,464,437 | 3/1949 | Dasher | 188/251 M X |
| 2,965,205 | 12/1960 | Winchell | 192/66 |
| 2,986,252 | 5/1961 | Du Bois | 192/107 M |
| 3,371,756 | 3/1968 | Spitz | 188/251 M |
| 3,434,998 | 3/1969 | Aldrich et al. | 188/251 M |
| 3,650,357 | 3/1972 | Nelson et al. | 192/107 M X |
| 3,702,126 | 11/1972 | Eklund et al. | 188/251 M |
| 3,703,224 | 11/1972 | Bray | 192/107 M X |
| 3,791,493 | 2/1979 | Yamaguchi et al. | 188/251 M |
| 3,802,849 | 4/1974 | Kimura et al. | 192/107 M X |
| 3,899,050 | 8/1975 | Savary et al. | 192/107 M X |
| 3,948,364 | 4/1976 | Lowey | 192/107 M X |
| 4,180,622 | 12/1979 | Burkhard et al. | 192/107 M X |
| 4,267,912 | 5/1981 | Bauer et al. | 192/107 M X |
| 4,290,510 | 9/1981 | Warren | 192/107 M X |

FOREIGN PATENT DOCUMENTS

| | | | |
|---|---|---|---|
| 0519583 | 3/1927 | Fed. Rep. of Germany . | |
| 7823724 | 10/1979 | Fed. Rep. of Germany . | |
| 47-14606 | 1/1972 | Japan | 188/251 M |
| 0248292 | 4/1947 | Switzerland . | |
| 0789987 | 1/1953 | United Kingdom . | |
| 0823675 | 11/1959 | United Kingdom . | |
| 0945445 | 1/1964 | United Kingdom | 192/53 F |
| 1052636 | 12/1966 | United Kingdom | 188/251 M |
| 1073410 | 6/1967 | United Kingdom . | |
| 1206823 | 9/1970 | United Kingdom | 192/107 M |

*Primary Examiner*—Rodney H. Bonck
*Attorney, Agent, or Firm*—Toren, McGeady, Stanger, Goldberg & Kiel

[57] ABSTRACT

In lubricated friction couplings, at least two surfaces are connected by frictional engagement. These surfaces in engagement with one another are termed friction partners. One friction partner consists of a ceramic material and the other friction partner consists of a metallic material or a ceramic material having a chemical composition other than that of the first friction partner. The metallic material is a material of the iron group, preferably sintered metal. The ceramic material is oxide ceramic, especially aluminium oxide or zirconium oxide or silicon nitride. The pairing of metal, especially sintered steel, against oxide ceramic increases the service life of the coupling while at the same time reducing the coupling travel.

The ceramic material can be connected to a carrier member, for example in the form of segments sintered into the carrier member. An important factor is the surface structure of the friction partners, that is to say the oxide ceramic should have a surface having a high proportion of pores.

15 Claims, 16 Drawing Figures

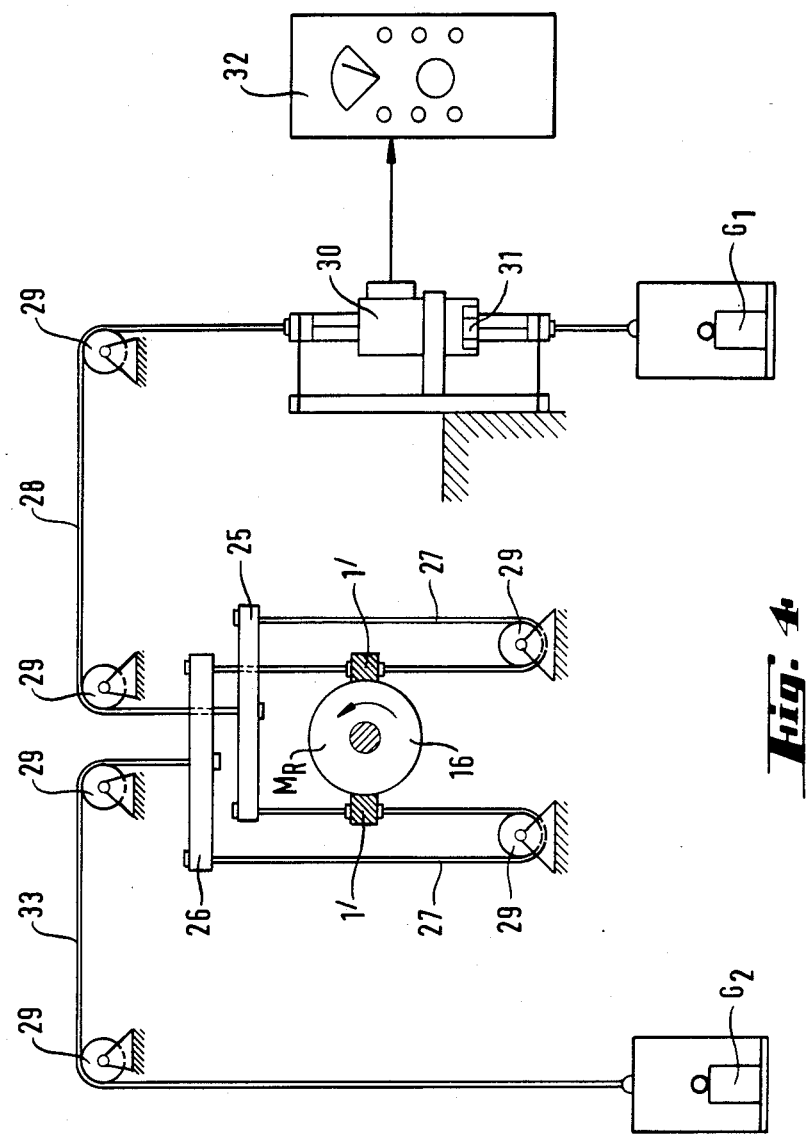

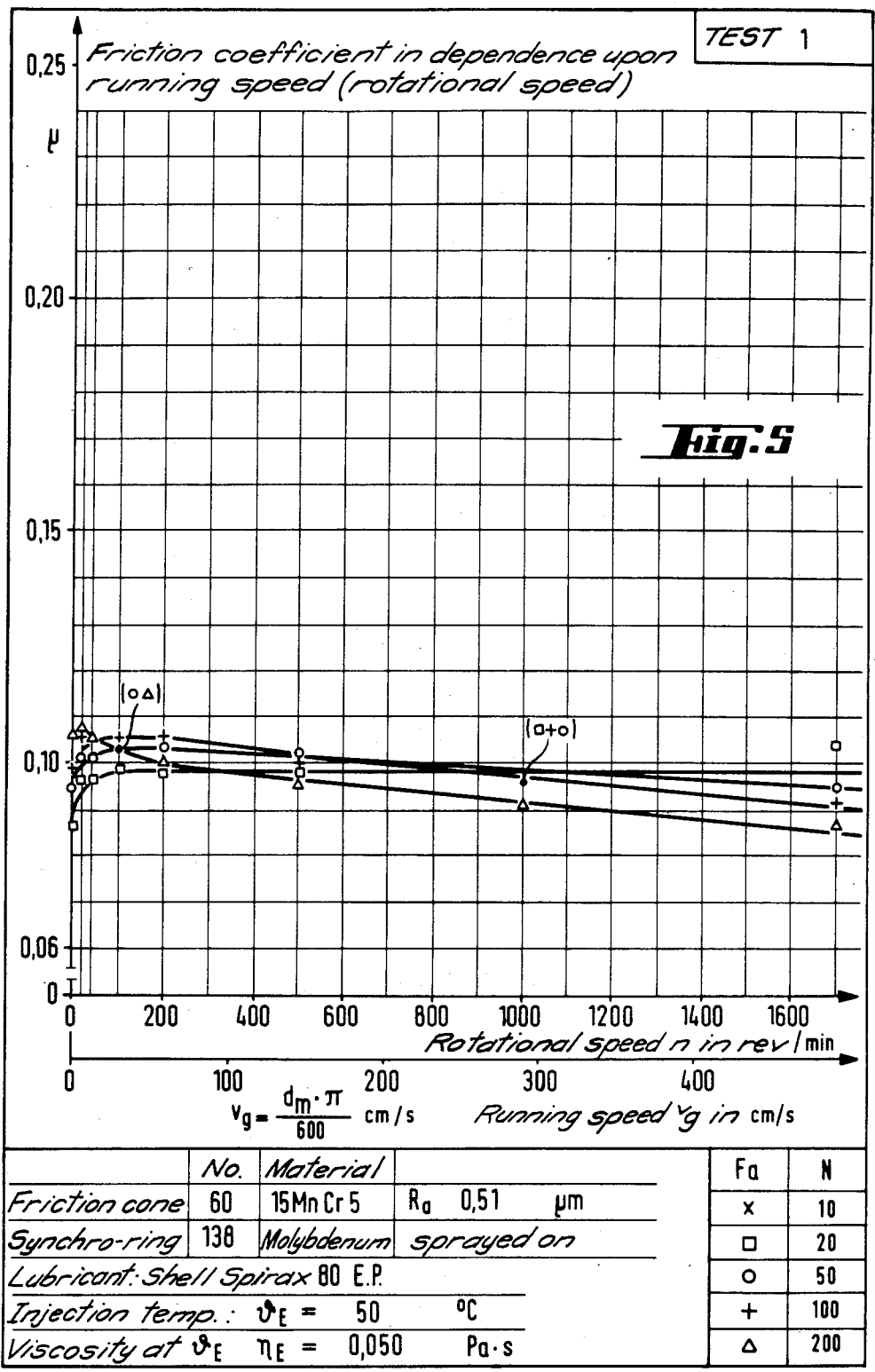

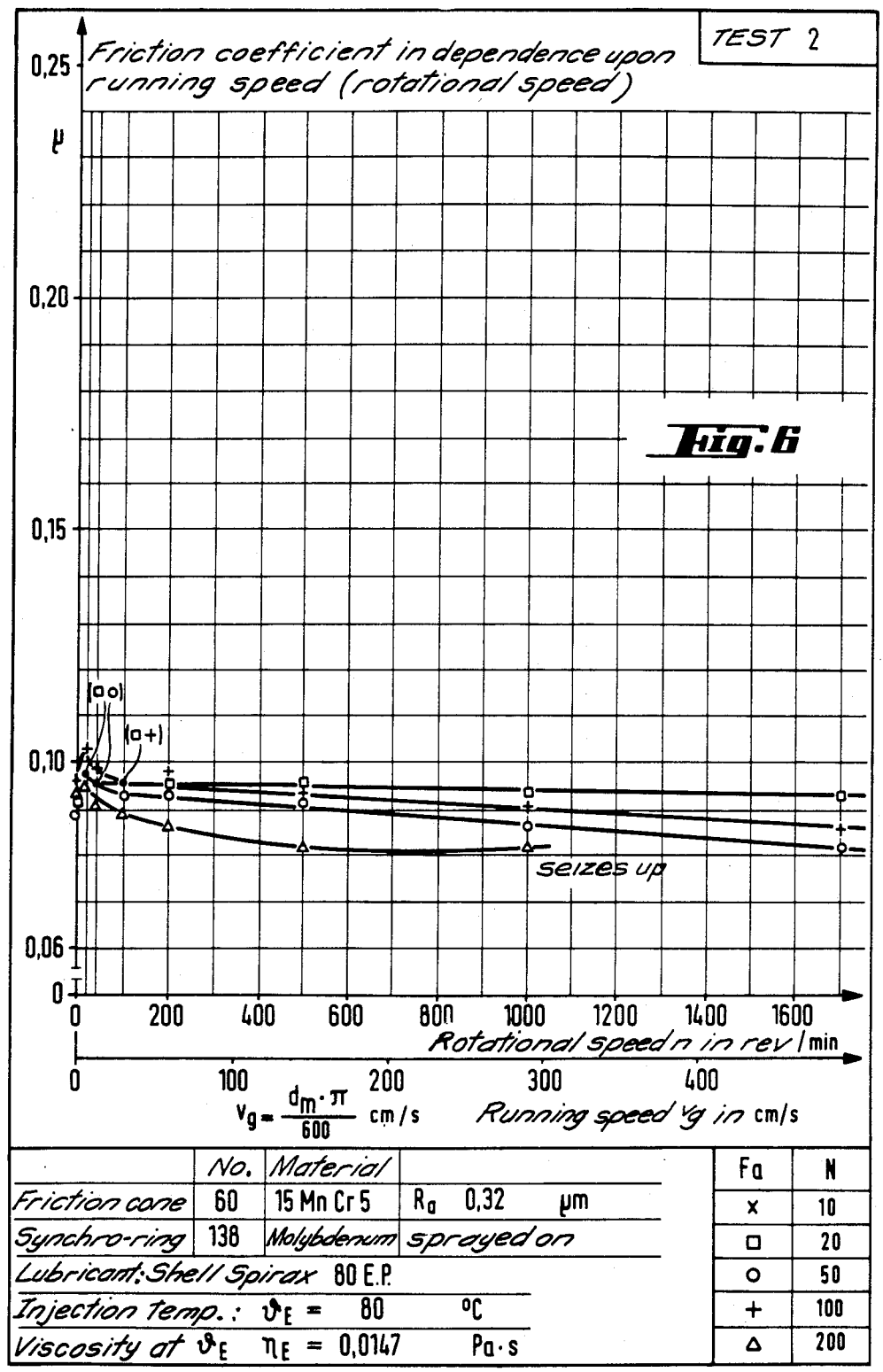

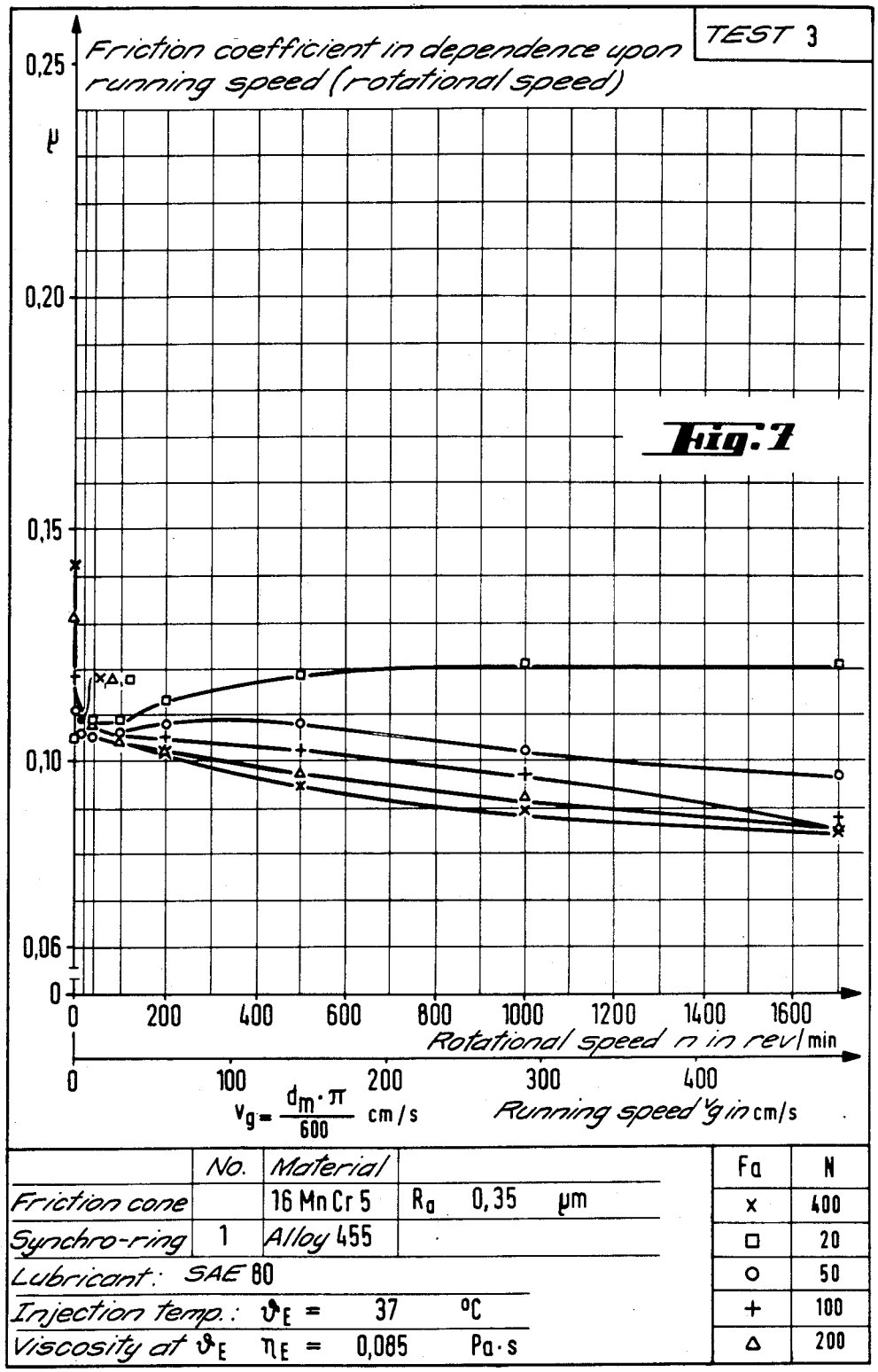

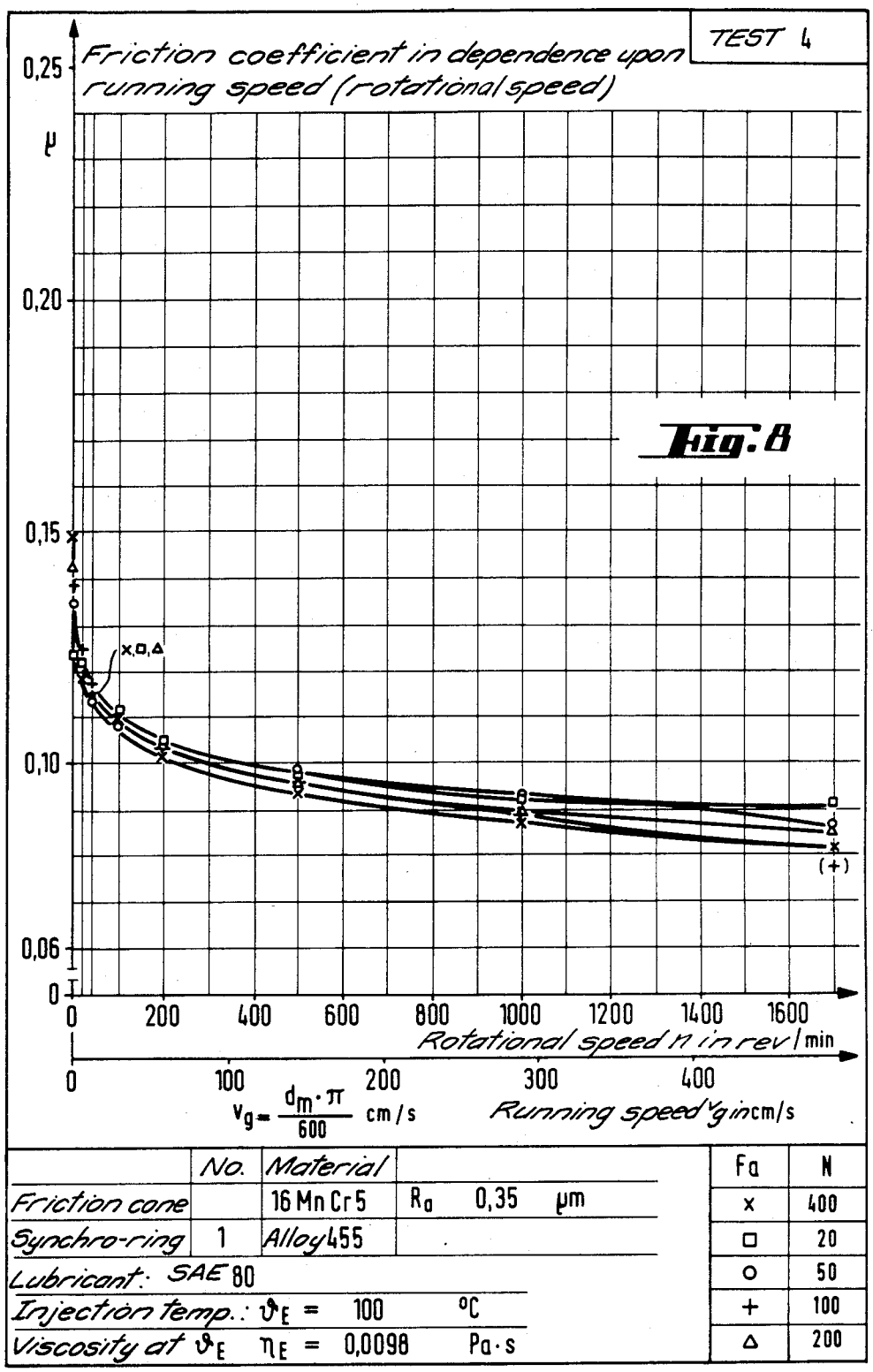

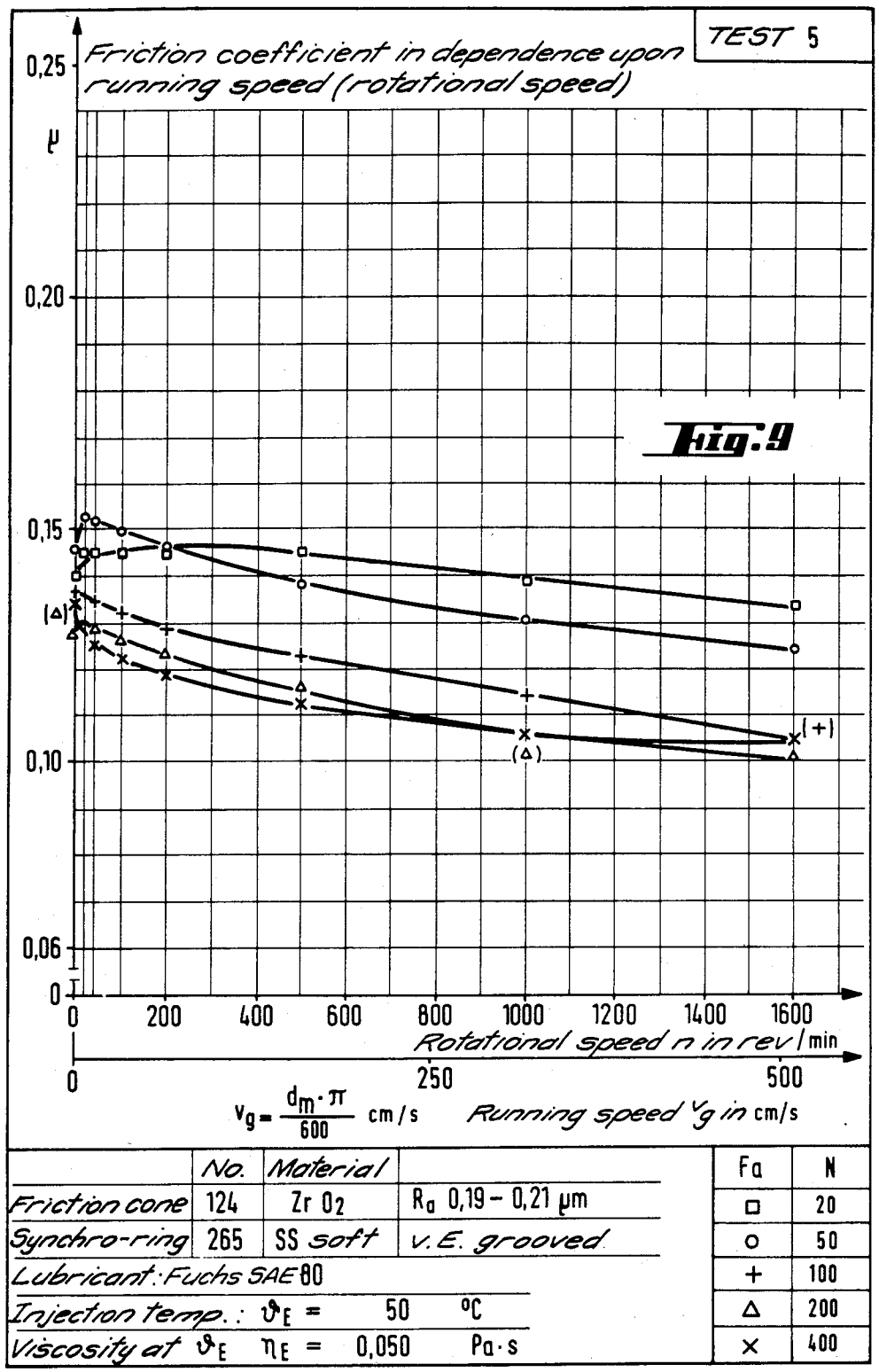

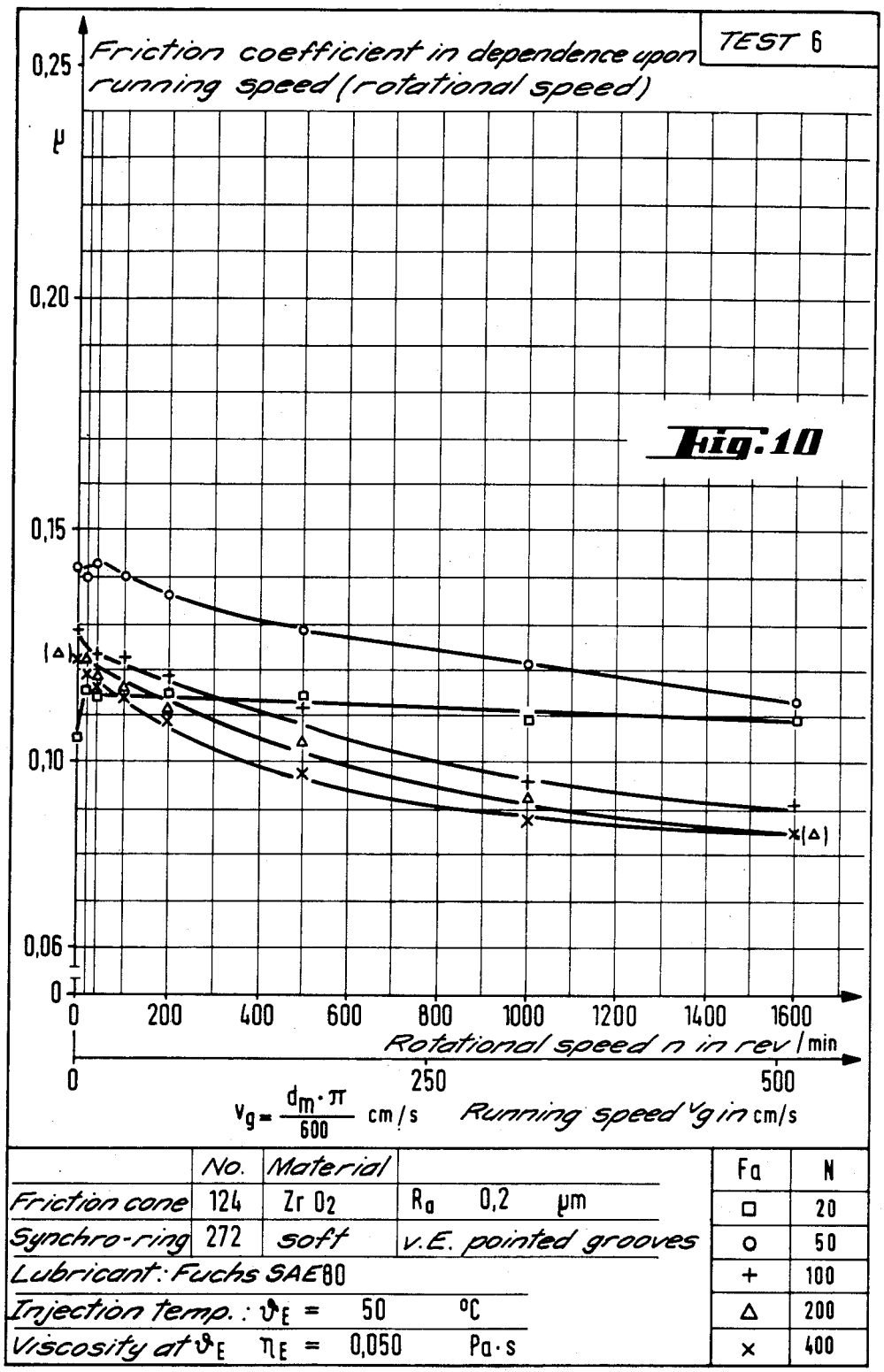

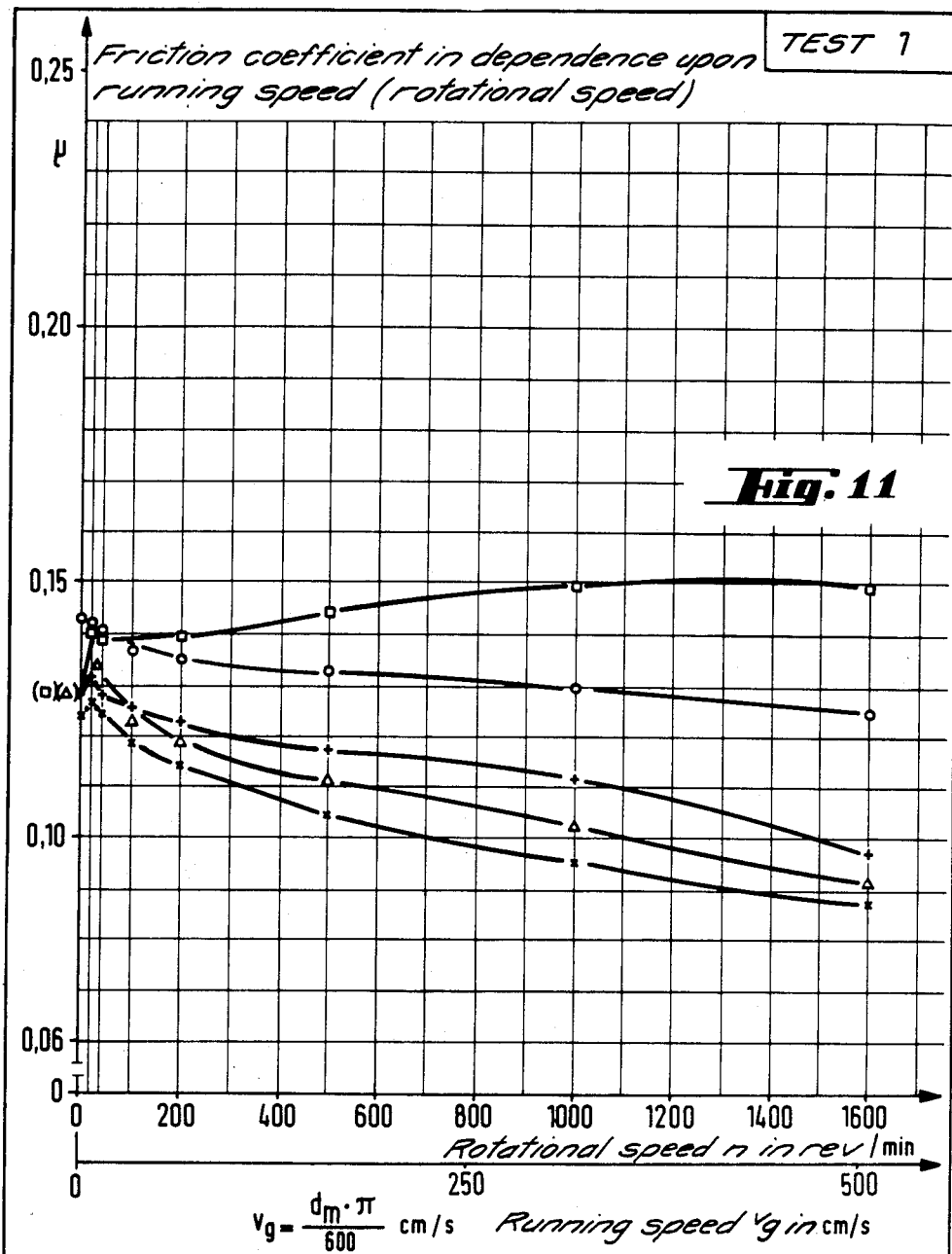

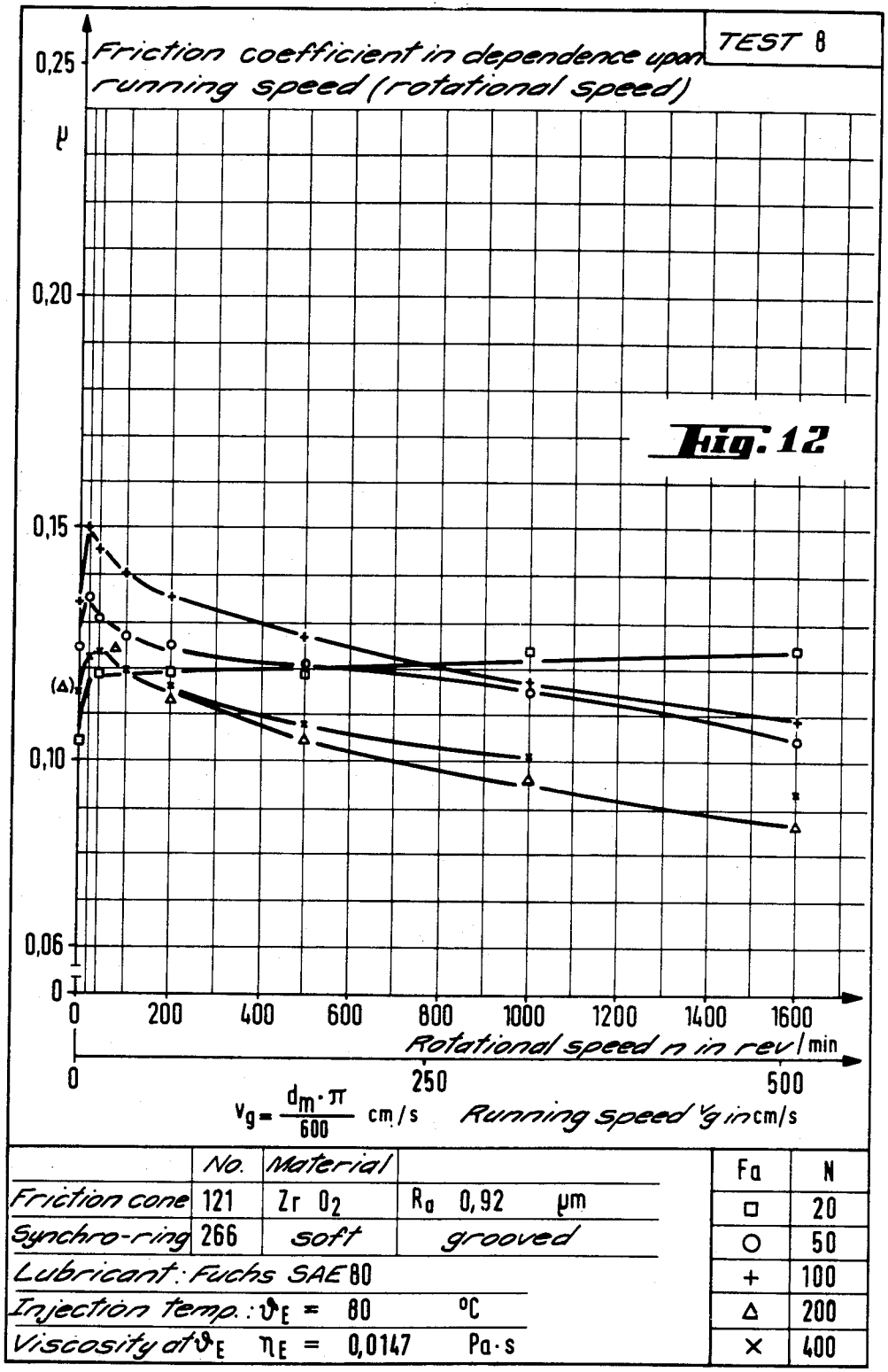

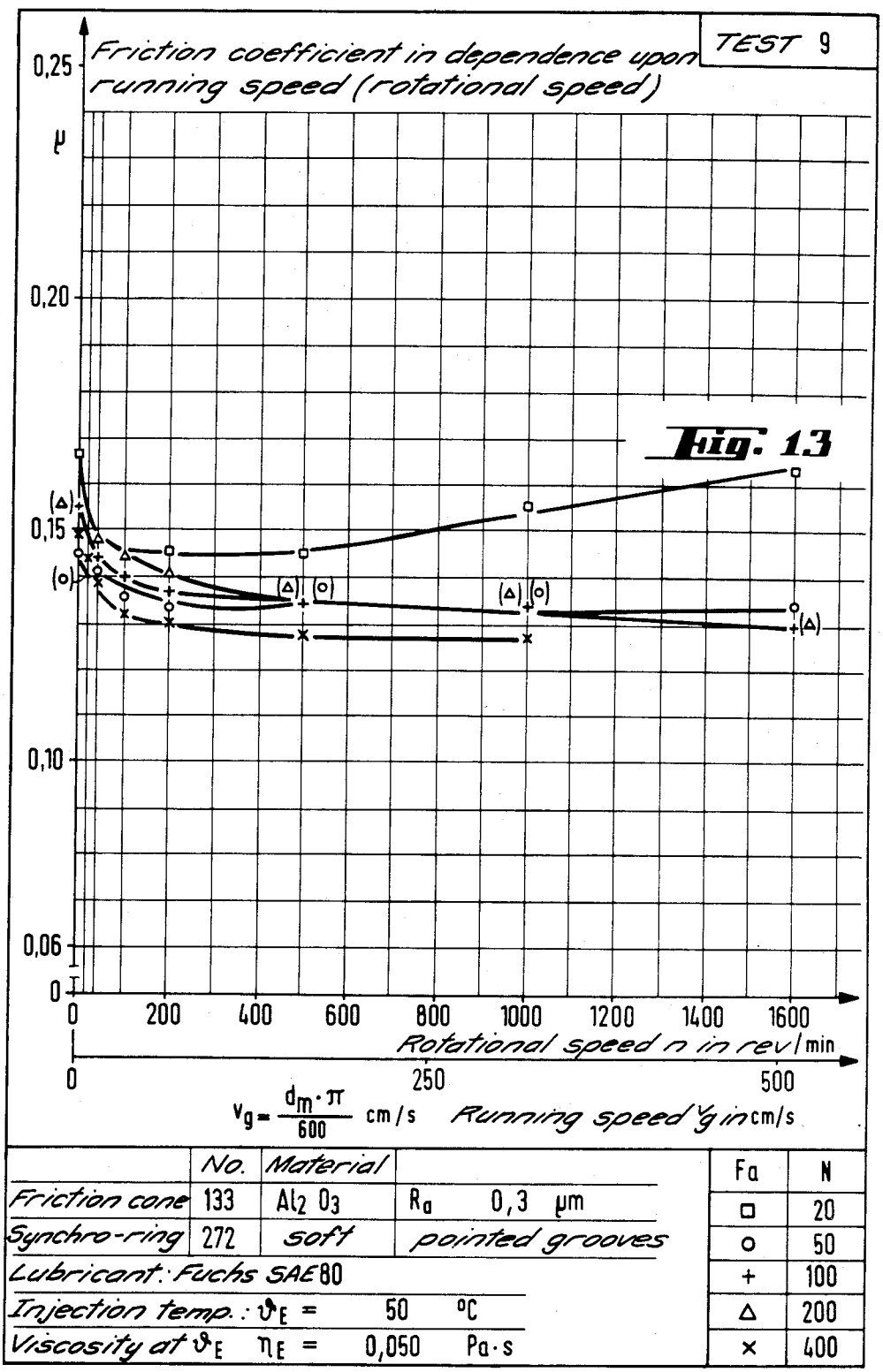

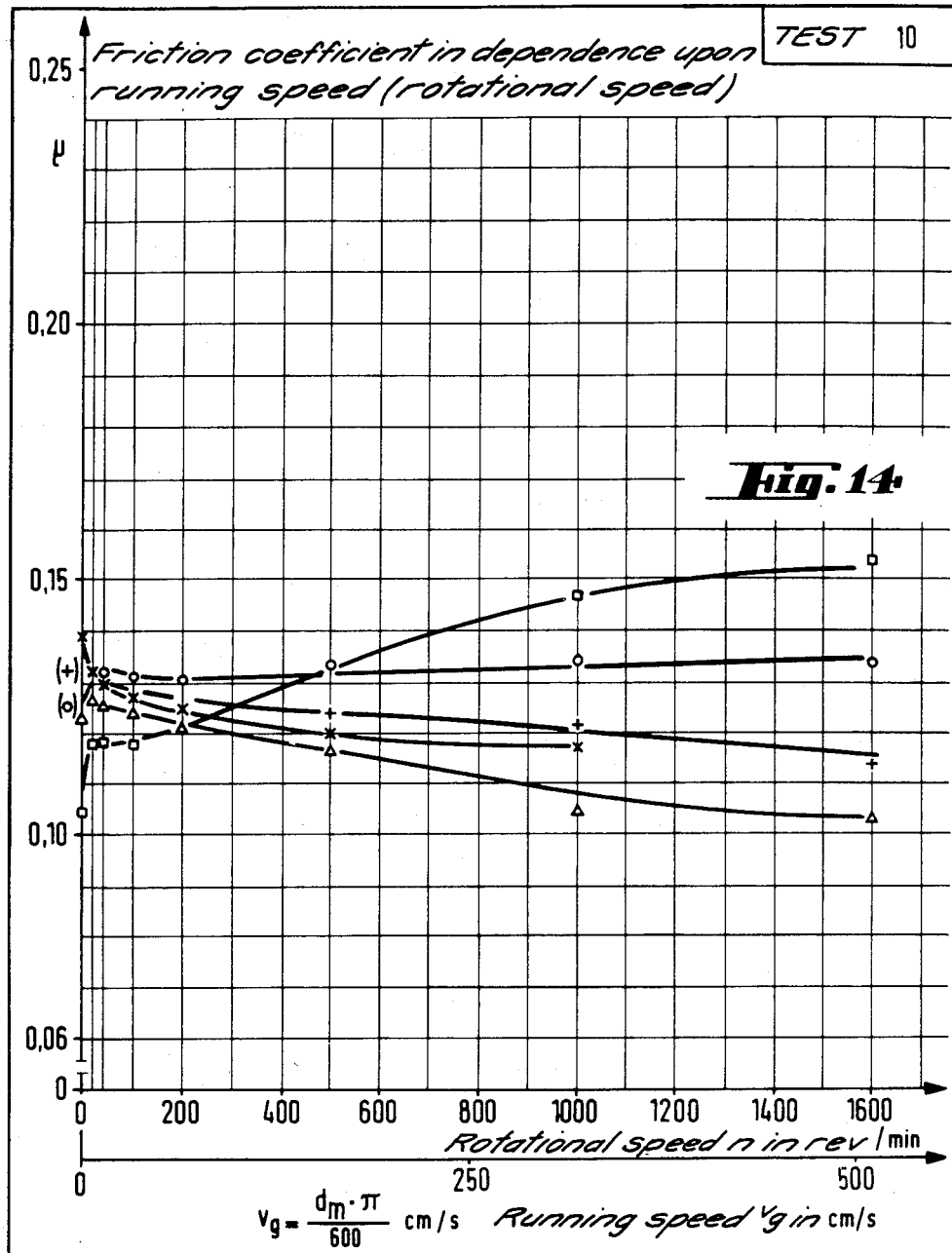

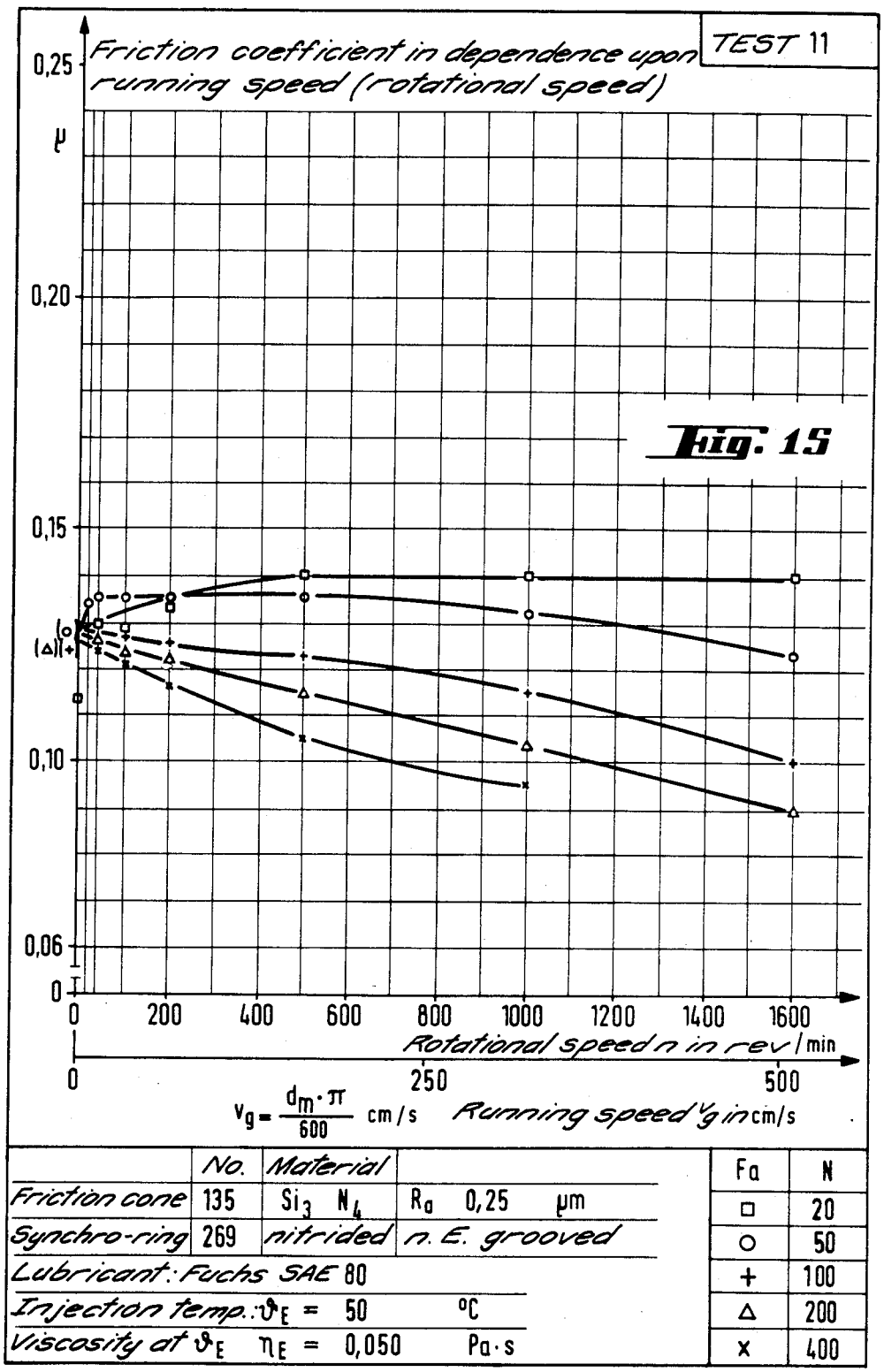

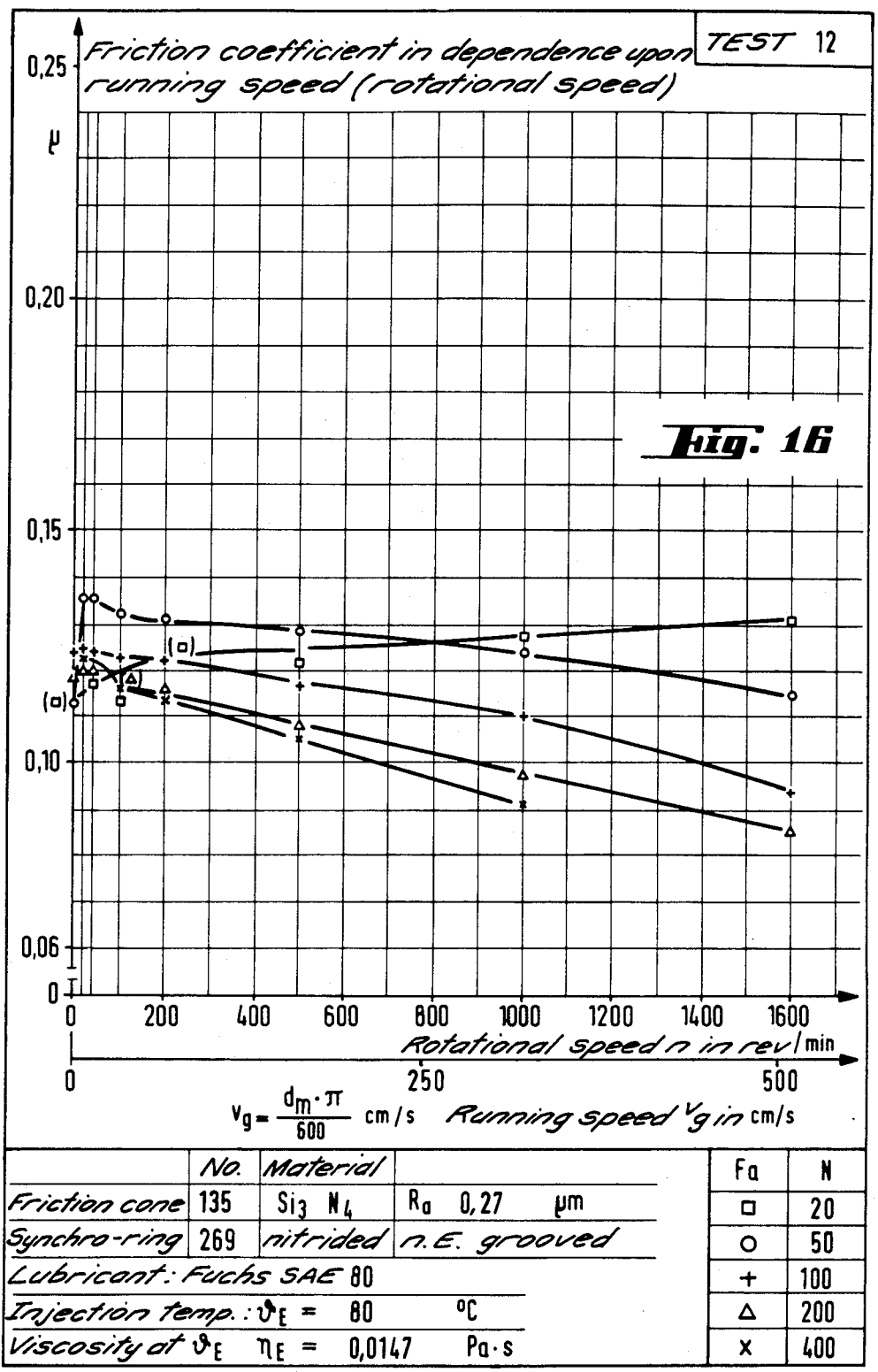

FRICTION PARTNERS FOR LUBRICATED FRICTION COUPLINGS

The invention relates to friction partners for lubricated friction couplings in which at least two surface are connected by frictional engagement, especially for synchronizing devices for positively-locking gear-shift couplings that consist of at least one synchronizing ring, and an equalizing ring assigned thereto, as friction partners.

The invention will be described in the following using a synchronizing device as an example, since synchronising devices in positively-locking gear-shift couplings, for example in motor vehicle gear-boxes, are subject to special demands. The use of the friction partners is not, however, limited to synchronizing devices.

In the case of synchronised speed-change or reversing gears in motor vehicles, when changing gear the gear wheel running freely on the shaft is brought into synchronization with the shaft by the axial pressing of a synchronizing ring against an equalizing ring that is assigned to the gear wheel, the transmission of the forces and moments from a sliding sleeve, which is connected to the shaft in such a manner that the sleeve is axially displaceable on but rotates with the shaft, to the synchronizing ring being effected by way of axial or radial blocking and/or dog teeth. The gear wheel is then connected in positively-locking manner to the shaft by axial displacement of the sliding sleeve which then engages in dog teeth on the equalizing ring. The equalising ring carrying the dog teeth can be formed directly on the gear wheel or alternatively can be connected to the gear wheel by a positively-locking connection and/or a frictional connection and/or a bonded or welded connection. In order to obtain synchrony between the synchronizing ring and the gear wheel, the synchronizing ring has externally conical or internally conical friction surfaces which, on axial contact of the synchronizing ring, come into contact with corresponding complementary surfaces on the equalizing ring and, as a result of the frictional connection that occurs, produce the synchrony necessary for completing the positively-locking coupling. These friction surfaces are termed friction partners in the present invention. It therefore concerns the pairing of two different materials that produce friction in contact with one another.

The construction and function are analogous in the case of synchronizing shaft couplings. The equalizing ring carrying the dog teeth is in this case arranged axially at the end of a shaft to rotate with the shaft, whilst the synchronizing ring is for its part connected to the second shaft by way of the sliding sleeve in such a manner that the synchronizing ring is axially displaceable on but rotates with the second shaft. If the two shafts are coupled to one another in a positively-locking manner, first the sliding sleeve and, therewith, the synchronizing ring are displaced axially on one shaft until, by means of the cone coupling, synchrony is obtained between the synchronizing ring and the equalising ring and, therefore, between the two shafts. The sliding sleeve is then brought into engagement with the dog teeth of the equalising ring.

By appropriately constructing the dog teeth on the synchronizing ring and the sliding sleeve, for example by axially sharpening the teeth so that they have suitable apical angles, it is possible for these to act also as blocking teeth and to prevent a positively-locking coupling being effected before synchrony is achieved.

The service life of such a synchronizing device and the quality of the synchronizing operations is substantially dependent upon the frictional properties of the cone coupling. Several proposals have already been made for obtaining frictional properties that are as good as possible. For example, it is known from German Offenlegungsschrift 27 44 994 to manufacture the synchronizing ring from metal or plastics material and to glue to the surface forming the coupling cone of the synchronizing ring a friction lining of an organically based friction material, especially a friction lining manufactured on a paper basis. By this method, in the case of this synchronizing ring there is obtained a separation of the problems to be overcome insofar as the synchronizing ring consists of a material having a relatively high strength for the blocking and/or dog teeth and the special friction lining has the necessary frictional properties.

The use of a separate friction lining on an organic basis has the disadvantage, however, that because of the difference in hardness between the friction partners, which is a result of the soft material of the friction lining on the synchronizing ring and the comparatively hard material of the friction surface of the equalizing ring, only a relatively low degree of surface pressure is allowable which, in turn, allows only slow displacement of the oil film on the friction surfaces and thus results in a long synchronizing period. Furthermore, the difference in hardness gives rise to high rates of wear of the friction surfaces per gear-shift operation which restrict the service life of the synchronizing device.

Analogous friction partners to those in the above-described specification are described in British patent specification No. 10 73 410. It is thus possible to provide the parts that are in engagement, that is to say a friction element, with molybdenum or an organic facing, or to apply a molybdenum coating or chromium plating.

German Utility Model No. 73 23 724 proposes the use of a bronze/steel pairing in order to provide the friction partners with axial and/or circumferential grooves, which can be constructed in the form of a screw thread, so that island-like bearing surfaces are formed.

Swiss patent specification No. 248 292 discloses in a cone coupling the use of metal against soft non-metal and the provision of circumferential grooves.

U.S. Pat. No. 2,044,930 describes synchronizing rings that consist of a material having a high friction coefficient, such as brass or cast iron, the complementary ring consisting of a similar material in each case.

In all those specifications the friction partners are lubricated. They therefore have the further feature in common that at least one of the friction partners has spiral or axial grooves or a combination of both types of groove. An earlier German patent specification, DE-PS 519 583, describes a coupling having friction plates of cork or felt, it also being possible to use a cone instead of plates. A coupling of that type, which originates from the early days of automobile construction, is naturally subject to considerably more wear, as a result of the combination of the materials cork/steel or felt/steel or brass, than the wet-operating couplings that have become known since then. They are also unable to transmit the high forces and moments required today.

The fundamental difference between the proposal described in German patent specification No. 519 583 and those discussed above lies, however, in the fact that it deals with dry friction in which completely different friction values occur which logically give rise to completely different rates of wear, so that, for this reason alone, friction partners running one against another in the dry state cannot be compared with those which are lubricated.

British patent specification No. 823 675 describes a brake plate for drum brakes in which a metal matrix having ceramic particles embedded therein is produced by sintering and is connected to a carrier. As metals there are used copper, zinc and tin, and as ceramic there is used silicon oxide, this being used in a range of from 3 to 30%. It is therefore a relatively soft matrix that accommodates only small quantities of ceramic. The friction partner of this matrix is, as is customary in brakes, a cast iron drum, and, of course, no lubrication must be allowed to penetrate between the friction partners.

The reference by August Schalitz, "Kupplungsatlas", gives a general summary of the materials used in couplings and brakes under the heading "friction materials". The summary also lists ceramic sintered materials that are defined as sintered bronzes having high ceramic additives. They therefore correspond to that already known from British patent specification No. 823 675.

Under the concept of frictional pairing the same reference then discusses the frictional pairing of steel/steel, which in the case of relatively high loads is possible only for wet operation and of which the dynamic friction coefficient is approximately 0.05. A further pairing possibility takes the form of steel against an organic friction lining. Here, in the case of wet operation, the dynamic friction coefficient is from 0.1 to 0.15. Furthermore, the reference also lists the combination steel against sintered bronze, the dynamic friction coefficient of this combination on wet operation being approximately 0.06.

The disadvantages that were described when discussing German Offenlegungsschrfit No. 27 44 994 are therefore inherent in the entire state of the art. The problem underlying the invention is, therefore, to construct the friction partners in such a manner that it is possible to obtain, in simple and economical manner, a long service life and an optimum friction coefficient characteristic of the friction partners. This problem is solved according to the invention in that one friction partner consists of a ceramic material and the other consists of a metallic material or a ceramic material having a chemical composition other than that of the first friction partner. As a result of this pairing of materials, the hardness of the friction partners is matched to one another in such a manner that a balanced difference in hardness is obtained while having a greater absolute hardness than in the case of previously known friction partners. It is thus possible to obtain higher surface pressure between the friction partners than previously with a more rapid displacement of the oil film and a shorter synchronising period. In addition, lower rates of wear are produced per gear-shift operation, that is to say that the service life of the friction partners and therefore of the whole assembly is increased.

A further advantage is that the friction partners are chemically stable and inert towards additives in the gearbox oil, and specifically towards the EP additives, and furthermore that they have strength stability at high temperature, especially compression and shear strength. As a result, high rates of frictional work are allowable so that the friction partners according to the invention are suitable, for example, for synchronising devices for especially large gears, such as gears in heavy goods vehicles and construction vehicles or for large shaft couplings.

As the metallic material for a friction partner there come into consideration both pure metals and metal alloys, for example brass, aluminium or titanium alloys. It is preferable to use as the metallic material, however, a material of the iron group, that is to say the elements cobalt, nickel and iron, and alloys thereof, the main emphasis being on iron. As the iron both cast iron, that is to say customary grey cast iron, and its special forms may be used, and it is equally possible to use steel and this too may be used in the form of a cast piece or in the form of a forged or pressed piece. The use of so-called sintered steel as the metallic material is especially preferred however, and in this case, in addition to the favorable frictional properties that this material possesses, there is also the advantage that, as a result of the sintering process, it is possible to obtain a workpiece which has high dimensional accuracy and which needs to be refinished only in a small number of places in order to obtain the desired fit.

The use of steel or sintered steel for, for example, synchronizing rings has the advantage over brass and other soft metal alloys that as a result of the high elasticity modulus of the material a high degree of rigidity and a very low degree of expansion of the synchronizing ring is obtained under the axial pressing force. At the same cone angle this results in a reduction of the gearshift travel. Furthermore, the blocking and/or dog teeth on the synchronizing ring and the equalizing ring are subject to a lower degree of wear as a result of the high strength and hardness of the steel material which can be obtained, for example, by an additional heat treatment.

An advantageous embodiment of the invention provides that the ceramic material is an oxide ceramic, preferably an oxide ceramic having an aluminium oxide content of at least 90% by weight. Generally suitable as ceramic materials are those based on silicides, borides, carbides or titanates. Those preferably used are, however, aluminium oxide, zirconium oxide and silicon nitride, since these materials have distinct advantages over the others with regard to their hardness and their friction coefficient characteristics.

It is known of oxide ceramics that they have higher strength values and also higher hardness values as their purity increases. Oxide ceramic is therefore the term generally used for a material that contains the oxide used at a purity of at least 80% by weight. In the region of an oxide content of above 90% by weight, especially in the region approaching 100% by weight, a few percentage points, even a tenth, improve the mechanical properties to a critical extent. Thus, for example, the hardness of an aluminium oxide ceramic having 97.5% by weight is $1.8 \times 10^4$ Vickers. If the proportion of aluminium oxide is increased by only 2%, the hardness will already be $2.2 \times 10^4$ Vickers, and an increase in the aluminium oxide content to 99.9% by weight results in a hardness of $2.3 \times 10^4$ Vickers. The elasticity modulus in this range changes from $3.6 \times 10^5$ N/mm$^2$ to $3.9 \times 10^5$ N/mm$^2$, whilst the compression strength increases from 3000 N/mm$^2$ to 4000 N/mm$^2$.

With this increase in quality, however, there is a parallel increase in the costs involved, since greater purity of the oxide simultaneously represents higher sintering temperatures and therefore greater expenditure. Efforts are therefore generally made to use high-purity aluminium oxide, this term being understood to mean a material that contains over 95% by weight of $Al_2O_3$, but not, however, to select the region immediately approaching 100% by weight, but rather to promote or control the desired properties of the aluminium oxide by means of additives of other oxides suitable for that purpose. Thus, for example, the grain growth can be controlled not only by the sintering conditions but also by the addition of magnesium oxide, and so on. The addition of other metal oxides makes it possible to tint the materials and it is also possible to lower the sintering temperature by means of additives suitable for that purpose.

Porosity is of considerable importance for the friction partners. It has been known for a long time to produce sintered materials that have a high porosity and, as a result, are able to store oil in the pores, that is to say that these materials have good emergency running properties. Such materials are generally used as bearing materials and, as such, as very soft. They are therefore unsuitable as friction partners for couplings and so on.

Sintered oxide ceramic can be made in the form of porous ceramic by a special heating process or by the addition of suitable agents. This porous ceramic has, however, only very low strength values, so that it too is unsuitable for use as a friction partner. A preferred embodiment of the invention therefore provides for the ceramic to consist of a dense-sintered oxide ceramic that has a surface having a high proportion of pores. The high proportion of pores in the surface of an oxide ceramic can be achieved by the selection of two parameters. The first parameter is the grain size of the finished sintered product. The second parameter is that the product must be abraded under certain conditions. The abrasion conditions are so chosen that a number of the grains are torn out of the bond with the adjacent grain, that is to say the grain is broken up, as a result of which a surface pore is produced. In the aluminium oxide ceramic containing 97.5% by weight of $Al_2O_3$ mentioned as an example, this porosity, considered as a total porosity, can be 3.5%, whereas with an aluminium oxide content of 99.9% by weight it is only 0.1%. For friction partners, since a high porosity is required, there is therefore used a ceramic material that has an aluminium oxide content of between 96% by weight and 98% by weight.

The circumstances are different when using silicon nitride as the ceramic material. Silicon nitride ceramics have good hardness and strength properties even in the case of relatively high porosity. According to an advantageous embodiment of the invention, therefore, the ceramic material consists of reaction-bonded silicon nitride having a porosity of between 15% and 25%. At a porosity of 25%, the Vickers hardness is $8 \times 10^3$ Vickers, and, if the porosity decreases to 20%, this increases to $11 \times 10^3$ Vickers. The hardness of a silicon nitride ceramic having the high porosity of 25% is, however, quite satisfactory and exceeds by far the hardness of the previously known and customary friction partners.

The great advantage of using ceramics that are porous at least at the surface over the previously known friction partners is that as a result of this porous surface, or as a result of the porosity of the whole in the case of silicon nitride, a friction partner is produced which, as such, as an excellent drainage action on grounds of the material properties alone. The state of the art assumes that in order to eliminate the oil film on the friction partner, it is always necessary to use drainage means constructed in the form of grooves or rings into which the oil can pass when the partners are pressed together. A certain oil film always remains on the friction partners, however, which cannot be displaced since for reasons of strength the oil-receiving grooves can be arranged only at certain distances from one another. By using a porous surface this region is reduced to a great extent so that virtually all the oil film can be displaced.

According to an advantageous embodiment of the invention, the ceramic material is connected to a carrier member. In the design in the form of a synchronizing ring, for the purpose of attachment the ceramic member, which in this case is constructed in the form of an internal cone, can be shrunk directly into the synchronizing ring. This procedure is especially suitable when aluminium oxide is used as the ceramic material. When using zirconium oxide, which has a higher elasticity than aluminium oxide, it is also possible to manufacture an external cone and to mount this, for example, onto the equalizing ring, it being possible here too for the mounting to be effected in the form of a shrinking-on operation, but it being equally possible to affix the ceramic part by means of additional mechanical means, for example clamping.

A further advantageous possibility of attachment consists in making the ceramic material in the form of segments and embedding them in the carrier member. In this case, in the example of a synchronizing ring, the internal surface of the ring does not consist entirely of ceramic but individual segments of the ceramic material are inserted into the ring, for example in the form of a dovetail arrangement.

An especially preferred embodiment of the invention provides for the segments to be sintered into the carrier material. This embodiment of the invention gives rise to a high saving in operating costs. The individual, ready-sintered ceramic segments are introduced into the mould of the synchronizing ring used as an example, and this is followed by the customary sintering process for the manufacture of sintered steel parts. Since the sintering temperature of the ceramic is considerably higher than the sintering temperatures of steel, the ceramic is not impaired during the sintering operation. On the other hand, a firm connection is produced between the ceramic and the carrier material.

A further advantageous embodiment of the invention provides that the ceramic material is applied to the carrier material in a thin layer by sputtering. The thickness of the layer is advantageously from 2 to 50 μm. Application by means of sputtering achieves very high adherence of the layer. Furthermore, the thickness of the layer can be kept very low, resulting in the use of relatively little material in conjunction with very good heat dissipation to the material of the synchronizing ring or the equalizing ring, that is to say of the carrier member. The thickness of the layer is preferably between 5 and 15 μm.

If the ceramic material is applied by sputtering it is also possible for at least one metal component to be embedded therein, as a result of which both the elasticity and the strength of the connection of the ceramic components with the carrier material are increased. The friction coefficient characteristic is also optimized.

In the following the invention will be described in more detail with reference to the drawings.

FIG. 4 is a diagram showing the principle of the friction moment measurement.

FIGS. 5 to 16 are graphs giving the friction coefficient in dependence upon the running speed.

Figure 1:
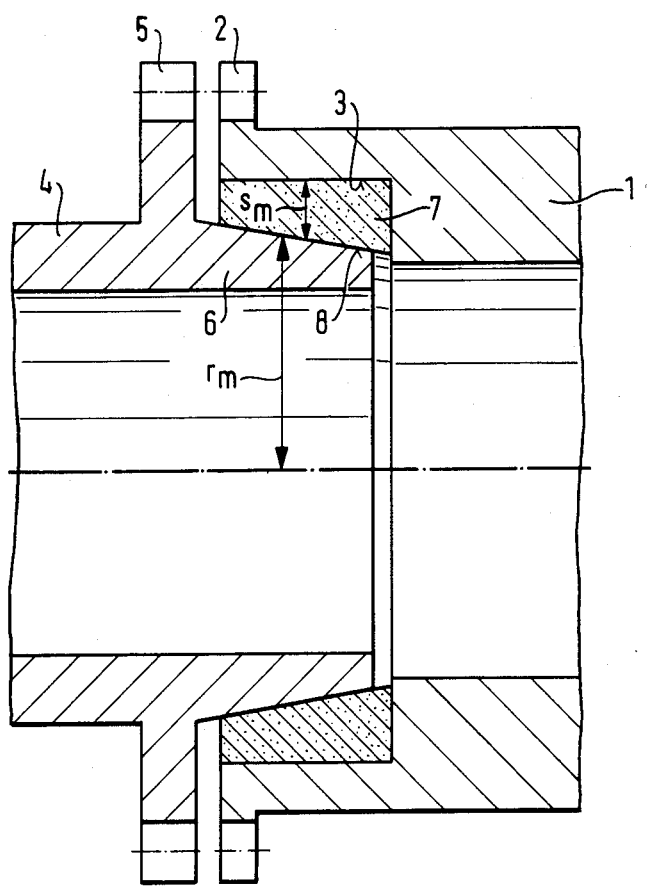
FIG. 1 shows a section through a synchronizing device having a friction lining constructed in the form of an annular member.

In the Figures, the reference numeral 1 indicates a synchronizing ring, which is shown in section, and the reference numeral 4 indicates an equalizing ring, which is also shown in section.

The synchronizing ring 1 carries radial blocking teeth 2 by means of which it is connected to the shaft by way of the sliding sleeve (which is not shown for the sake of clarity) in such a manner that the synchronizing ring rotates with but is axially displaceable on the shaft. In the radial dog teeth 5 of the equalizing ring 4 there engage corresponding teeth on the sliding sleeve in order to effect a positively-locking connection of the shaft and the equalizing ring 4. The synchrony between the synchronizing ring 1 and the equalizing ring 4 that is necessary for the positively-locking connection is effected by a cone coupling.

According to FIG. 1, the cone coupling is constructed as follows: a projection 6 having an externally conical surface is formed on the equalizing ring 4, whilst the synchronizing ring 1 has a straight hollow bore 3 which has an internal diameter greater than the largest external diameter of the projection 6 on the equalizing ring 4 and into which there is inserted, as the friction lining, an annular member 7 of ceramic material having a corresponding internally conical friction surface 8. The annular member 7 is pressed or glued into the hollow bore 3 of the synchronizing ring 1. The average thickness $s_m$ of the annular member 7 depends upon the average friction radius $r_m$, the ratio of the average thickness $s_m$ of the annular member 7 to the average friction radius $r_m$ being between 0.03 and 0.3.

Instead of inserting the annular member 7 into the hollow bore 3 of the synchronizing ring 1, it is also possible to glue or press the annular member 7 onto a projection of uniform circumference that is formed on the equalizing ring 4, and to give the annular member 7 an externally conical surface and the hollow bore of the synchronizing ring 1 an internally conical surface.

According to FIG. 2, the cone coupling is constructed as follows: as the friction lining, a thin layer 9 of a hard, wear-resistant mineral-containing material is applied by sputtering to a projection 6 having an externally conical surface that is formed on the equalizing ring 4, and the synchronizing ring 1 has a hollow bore 3 having an internally conical surface corresponding to the externally conical contour of the layer 9: the thickness of the layer 9 of chromium nitride that has been applied by sputtering is 12 $\mu$m. In order to convey away oil and wear particles, there are provided in the surface of the hollow bore 3, for example, axial grooves 10 and grooves 11 extending in circumferential direction.

In the case of this embodiment too, the layer of mineral-containing material may be applied, by sputtering, not to the projection 6 of the equalizing ring 4, but to the surface of the hollow bore 3 of the synchronizing ring 1. It is also possible to construct the grooves for conveying away the oil or wear particles directly in the layer of mineral-containing material and/or in the coated base material.

Figure 2:
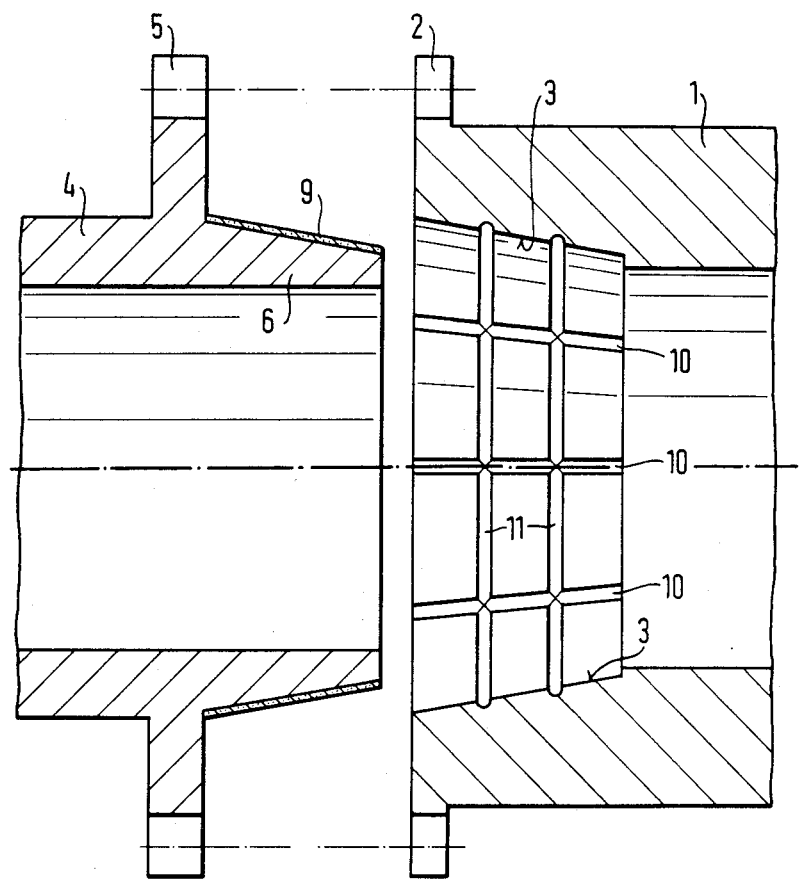
FIG. 2 shows a section through a synchronizing device having a sputtered-on layer as the friction lining.

In addition to the embodiments of the synchronizing device shown in FIG. 1 and FIG. 2, it is also possible to arrange the externally conical surface on the synchronizing ring 1 and the internally conical surface on the equalising ring 4.

In all the embodiments of the synchronizing device, the synchronizing ring 1 and the equalizing ring 4 can be made of steel, especially sintered steel, of cast iron or the above-mentioned metal alloys. If the synchronizing device is to be used for motor vehicle speed-change gears, the equalizing ring 4 can be formed directly on a gear wheel that is seated loosely on the shaft, or can be connected thereto by a positively-locking connection and/or a frictional connection and/or a welded or bonded connection.

Figure 3:
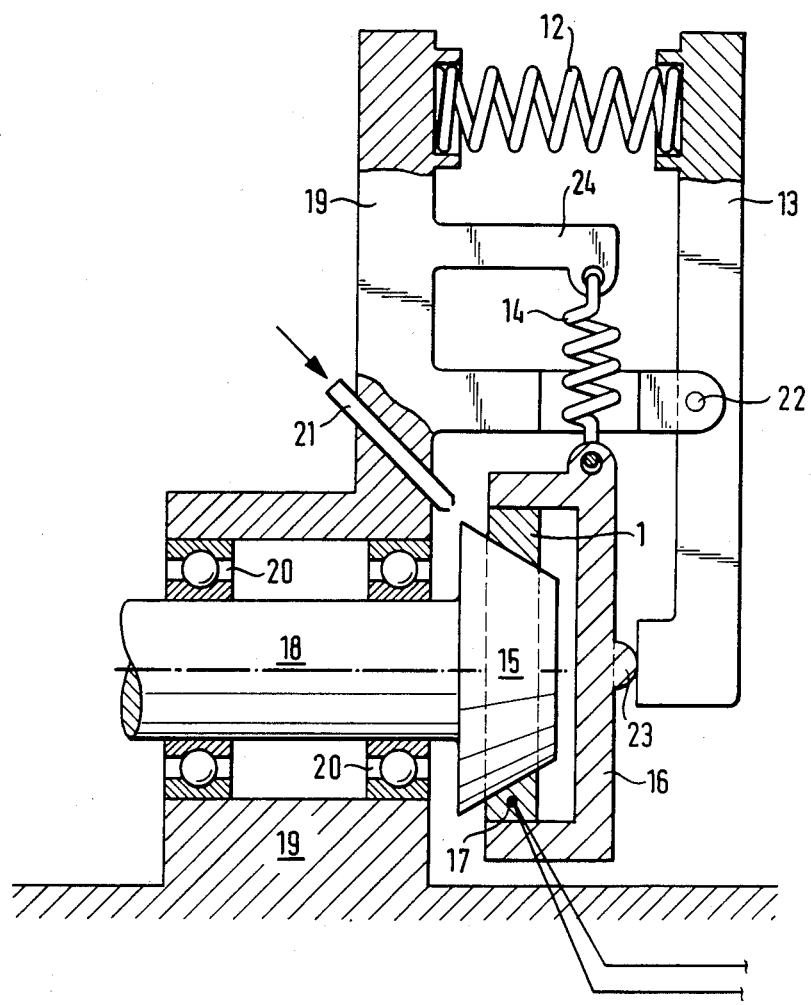
FIG. 3 shows diagrammatically a synchro-ring test apparatus in axial section.

FIGS. 3 and 4 show a diagram of the basic structure of a test apparatus for synchro-rings of the sort set up for carrying out the measurements that were used as the basis of FIGS. 5 to 16. The mechanical part of the test apparatus consists basically of a frame 19 in which the drive shaft 18, which carries the friction cone 15, is mounted in ball bearings 20. This drive shaft 18 is driven by a traction drive mechanism that is operated by an electric motor.

The spring suspension device 14, which holds the carrier 16 for the synchro-ring 1, engages on the spring arm 24 which is part of the frame 19. At the working point 23 of the carrier 16 there engages a lever 13 which is mounted in the joint 22 and presses the synchro-ring 1 against the friction cone 15 by way of the pressure spring 12. The rise in temperature that occurs on so doing is detected by means of the thermocouple 17. An oil nozzle 21 is used for supplying the lubricant which is heated to a desired temperature before injection. The lubricants that were used for the individual experiments can be seen in the notes that follow the graphs, these notes also showing the injection temperature and the viscosity of the lubricant.

The pressure springs 12 are calibrated springs so that by exchanging the pressure springs 12 defined pressing forces can be exerted.

The springs for suspending the synchro-ring 1 make it possible to obtain a slight rotation when the torque is transmitted between cone and ring. This rotation moves the carrier 16 which transfers it via the transmission cables 27 after being deflected over deflection pulleys 29 to the lower balance arm 25, and to the upper balance arm 26. The upper balance arm 26 is connected to the standard weight G2 by means of a cable 33 which is guided over deflection pulleys 29; the lower balance arm 25 is connected to the force measuring cell 30 by means of a cable 28 which is guided over deflection pulleys 29. The force measuring cell 30 is connected to the counterweight G1 for zero displacement via the oil damper 31 and transmits the measuring values obtained to the measuring bridge 32.

The test apparatus has the following data:

The pressing force of the synchro-ring 1 on the friction cone 15 can be set varied infinitely between 10 and 400N. The rotational speed of the drive shaft 18 and thus of the friction cone 15 can be set varied infinitely between 0 and 1700 rev./min.. The speed has been kept constant in the measuring points of the diagram. The oil is supplied by means of temperature-controlled oil injection into the gap between the friction cone 15 and the synchro-ring 1. The oil injection temperature was kept constant in the individual experiments and could be regulated between 30° and 100° C. The measuring accuracy of the test apparatus was ±2%. The friction surface diameter was 55 mm, the friction surface width was 10 mm and the cone angle was 6 degrees and 30 minutes.

FIGS. 5 and 6 show graphs in which the friction cone consisted of the material 15MnCr5 having an $R_a$ value of 0.51 μm and an $R_a$ value of 0.32 μm, respectively. The commercially available synchro-ring had a sprayed-on layer of molybdenum.

FIGS. 7 and 8 also show graphs of commercially available synchro-rings consisting of a brass alloy, and running against a friction cone consisting of the material 16MnCr5.

FIGS. 9 and 16 show the pairing of the friction partners according to the invention. In FIG. 9 the friction cone consists of zirconium oxide which runs against a groove synchro-ring of non-hardened sintered steel. The grooving is in the form of a trapezoidal screw thread.

In FIG. 10 the groove that has been provided is pointed and, at an angle of approximately 60 degrees, corresponds to a Whitworth screw thread.

FIGS. 11 and 12 differ from those mentioned above by their coarseness values. In FIGS. 13 and 14 aluminium oxide was used as the friction cone material. The material of the synchro-ring is again non-hardened sintered steel. The difference between the two graphs is a result of the different lubrication temperatures.

FIGS. 15 and 16 show a friction cone of silicon nitride. The synchro-ring again consists of sintered steel. This sintered steel has been subjected to nitride hardening, however. The grooving is trapezoidal.

We claim:

1. In friction partners for wet lubricated friction couplings in which at least two surfaces are connected by frictional engagement, especially for synchronizing devices for positively-locking gear-shift couplings that consist of at least one synchronizing ring and an equalizing ring the improvement which comprises a first friction partner consisting of a first ceramic material and a second friction partner of a metallic or second ceramic material having a chemical composition different from that of the first friction partner, said first ceramic material being a dense sintered oxide ceramic having a surface which has a high proportion of pores.

2. Friction partners according to claim 1, wherein the metallic material is a material of the iron group.

3. Friction partners according to claim 1 or 2, wherein the metallic material is a sintered steel.

4. Friction partners according to claim 1, wherein the first ceramic material is oxide ceramic.

5. Friction partners according to claim 1 or 4, wherein the first ceramic material is an oxide ceramic having an aluminium oxide content of at least 90% by weight.

6. Friction partners according claim 1 or 4, wherein the first ceramic material is a zirconium oxide.

7. Friction partners according to claim 1, wherein the first ceramic material is a silicon nitride.

8. Friction partners according to claim 1, 2, or 7, wherein at least one metal component is embedded in the first ceramic material.

9. Friction partners according to claim 1, wherein the first ceramic material is connected to a carrier member.

10. Friction partners according to claim 1 or 9, wherein the first ceramic material is made in the form of segments that are embedded in the carrier member.

11. Friction partners according to claim 10, wherein the segments are sintered into the carrier member.

12. Friction partners according to claim 1, characterised in that the first ceramic material is applied to the carrier member in a thin layer by sputtering.

13. Friction partners according to claim 12 the thickness of the layer is from 2 to 50 μm.

14. Friction partners according to claim 1 or 9, wherein at least one of the friction partners has drainage means in the region of contact with the other friction partner.

15. Friction partners according to claim 1 or 9, wherein the first ceramic material is a reaction-bonded silicon nitride having a porosity of from 15 to 25%.

* * * * *